United States Patent
Takagi

(10) Patent No.: US 11,312,184 B2
(45) Date of Patent: Apr. 26, 2022

(54) CONSTRUCTION VEHICLE TIRE

(71) Applicant: BRIDGESTONE CORPORATION, Tokyo (JP)

(72) Inventor: Kota Takagi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 221 days.

(21) Appl. No.: 16/622,877

(22) PCT Filed: Aug. 6, 2018

(86) PCT No.: PCT/JP2018/029383
§ 371 (c)(1),
(2) Date: Dec. 13, 2019

(87) PCT Pub. No.: WO2019/044394
PCT Pub. Date: Mar. 7, 2019

(65) Prior Publication Data
US 2020/0207155 A1    Jul. 2, 2020

(30) Foreign Application Priority Data
Aug. 30, 2017   (JP) .............................. JP2017-165551

(51) Int. Cl.
*B60C 11/13*    (2006.01)
*B60C 11/03*    (2006.01)

(52) U.S. Cl.
CPC ...... *B60C 11/0309* (2013.01); *B60C 11/1307* (2013.01); *B60C 2011/036* (2013.01); *B60C 2200/065* (2013.01)

(58) Field of Classification Search
CPC ........... B60C 2200/065; B60C 11/1307; B60C 11/1376; B60C 11/1384; B60C 11/13;
(Continued)

(56) References Cited

U.S. PATENT DOCUMENTS

2011/0005649 A1   1/2011   Aoki
2011/0005652 A1   1/2011   Ono et al.
(Continued)

FOREIGN PATENT DOCUMENTS

CA    2018565 A1    12/1990
CN    105008148 A   10/2015
(Continued)

OTHER PUBLICATIONS

JP 2007230399 Machine Translation; Kawai, Toshiyuki (Year: 2007).*

(Continued)

*Primary Examiner* — Robert C Dye
*Assistant Examiner* — Nicholas J Weiler
(74) *Attorney, Agent, or Firm* — Oliff PLC

(57) ABSTRACT

A center block of a construction vehicle tire is formed in a range of ⅛-⅜, inclusive, of a tread width. A width direction narrow groove is terminated in the center block. A notch groove includes outer grooves formed at each end side of the narrow groove, and inner grooves formed between the outer grooves. A slope portion of the outer groove is inclined to be close to an inner side in the tire radial direction toward one side in the tire circumferential direction. A slope portion of the outer groove is inclined to be close to the inner side in the tire radial direction toward another side in the tire circumferential direction. A slope portion of each inner groove is inclined to be close to the inner side in the tire radial direction toward one side or another in the tire circumferential direction.

10 Claims, 6 Drawing Sheets

(58) Field of Classification Search
CPC ..... B60C 2011/0383; B60C 2011/0381; B60C 2011/1254; B60C 2011/1281; B60C 11/04; B60C 11/042; B60C 2011/133
See application file for complete search history.

(56) References Cited

U.S. PATENT DOCUMENTS

| | | |
|---|---|---|
| 2014/0224395 A1 | 8/2014 | Kawakami |
| 2016/0023518 A1 | 1/2016 | Kawakami |
| 2017/0225518 A1 | 8/2017 | Kakuta et al. |

FOREIGN PATENT DOCUMENTS

| | | | |
|---|---|---|---|
| CN | 106470849 A | 3/2017 | |
| EP | 2 974 888 A1 | 1/2016 | |
| JP | H03-010910 A | 1/1991 | |
| JP | H07-052613 A | 2/1995 | |
| JP | H09-175118 A | 7/1997 | |
| JP | 2007230399 A * | 9/2007 | .......... B60C 11/0311 |
| JP | 2009-137519 A | 6/2009 | |
| JP | 2009-227264 A | 10/2009 | |
| WO | 2013/035889 A1 | 3/2013 | |
| WO | 2014/142348 A1 | 9/2014 | |

OTHER PUBLICATIONS

Nov. 6, 2018 International Search Report issued in International Patent Application No. PCT/JP2018/029383.
Apr. 26, 2021 Extended Search Report issued in European Patent Application No. 18849543.6.

* cited by examiner

CONSTRUCTION VEHICLE TIRE

TECHNICAL FIELD

The present invention relates to a construction vehicle tire including a tread in which a slope-like notch groove is formed.

BACKGROUND ART

In a tire, which is a so-called construction vehicle tire, mounted to a dump truck or the like that travels on an uneven ground such as a mine, it is important to suppress a temperature increase of a tread from a viewpoint of ensuring the durability. In particular, in a case in which a large construction vehicle tire (the tire mounted to a large dump truck used in a mine or the like) is used, a load of approximately 25-100 tons is applied to each tire, and thereby a crack on the tread is progressed due to the heat generation of the tread.

Thus, a structure that cools the tread by forming a notch groove including a slope portion, which is inclined toward an inner side in a tire radial direction, on the tread has been known (for example, Patent Literature 1).

Specifically, one notch groove or a pair of the notch grooves is formed in a center block provided in a center part in a tire width direction. According to such a construction vehicle tire, air flows into the slope-like notch groove in accordance with rolling of the tire, so that heat exchange on a surface of the tread is facilitated. Consequently, the temperature increase of the tread can be suppressed.

CITATION LIST

Patent Literature

[PTL 1] International Publication No. WO2014/142348

SUMMARY OF INVENTION

In recent years, it is strongly desired that the construction vehicle tire described above can adapt to a high speed and a large load of a vehicle. Specifically, both of ensuring the wear resistance of the tread and suppressing the temperature increase of the tread are desired to be achieved at a high level.

It is considered, from a viewpoint of improving the wear resistance of the tread, to enlarge a size in the tire width direction of the center block and not to form a circumferential direction groove at all in the center block.

However, in the tread having such a wide center block not including the circumferential direction groove, the temperature is easily increased in accordance with the rolling of the tire. Therefore, even if the slope-like notch groove described above is formed, it is difficult to effectively suppress the temperature increase of the tread.

Accordingly, an object of the present invention is, in consideration of the problem described above, to provide a construction vehicle tire capable of achieving both of ensuring wear resistance of a tread and suppressing a temperature increase of the tread at a high level, even in a case in which a wide center block not including a circumferential direction groove is provided.

One aspect of the present invention is a construction vehicle tire (construction vehicle tire 10) provided with a tread (tread 20) having a center block (center block 80) formed in a center part in a tire width direction, the center block including a width direction narrow groove (width direction narrow groove 90) extended in the tire width direction, and a notch groove (notch groove 100) communicated with the width direction narrow groove and having a slope portion (slope portion 130, 230) inclined toward an inner side in a tire radial direction. The center block is formed in a range of 1/8-3/8, inclusive, of a tread width in each of one side and another side in the tire width direction with respect to a tire equatorial line. A circumferential direction groove extended in a tire circumferential direction is not formed in the center block. The width direction narrow groove is terminated in the center block. The notch groove includes a first outer groove (outer groove 210) formed at one end side in the tire width direction of the width direction narrow groove, a second outer groove (outer groove 220) formed at another end side in the tire width direction of the width direction narrow groove, and a plurality of inner grooves (inner grooves 110, 120) formed between the first outer groove and the second outer groove. A slope portion of the first outer groove is inclined to be close to the inner side in the tire radial direction toward one side in the tire circumferential direction. A slope portion of the second outer groove is inclined to be close to the inner side in the tire radial direction toward another side in the tire circumferential direction. Each of slope portions of the inner grooves is inclined to be close to the inner side in the tire radial direction toward one side or another side in the tire circumferential direction.

DESCRIPTION OF EMBODIMENTS

Hereinafter, embodiments of the present invention will be described with reference to the drawings. The same reference signs or similar reference signs are assigned to the same functions or the same components and the description thereof is therefore omitted.

(1) Schematic Configuration of Construction Vehicle Tire

Figure 1:
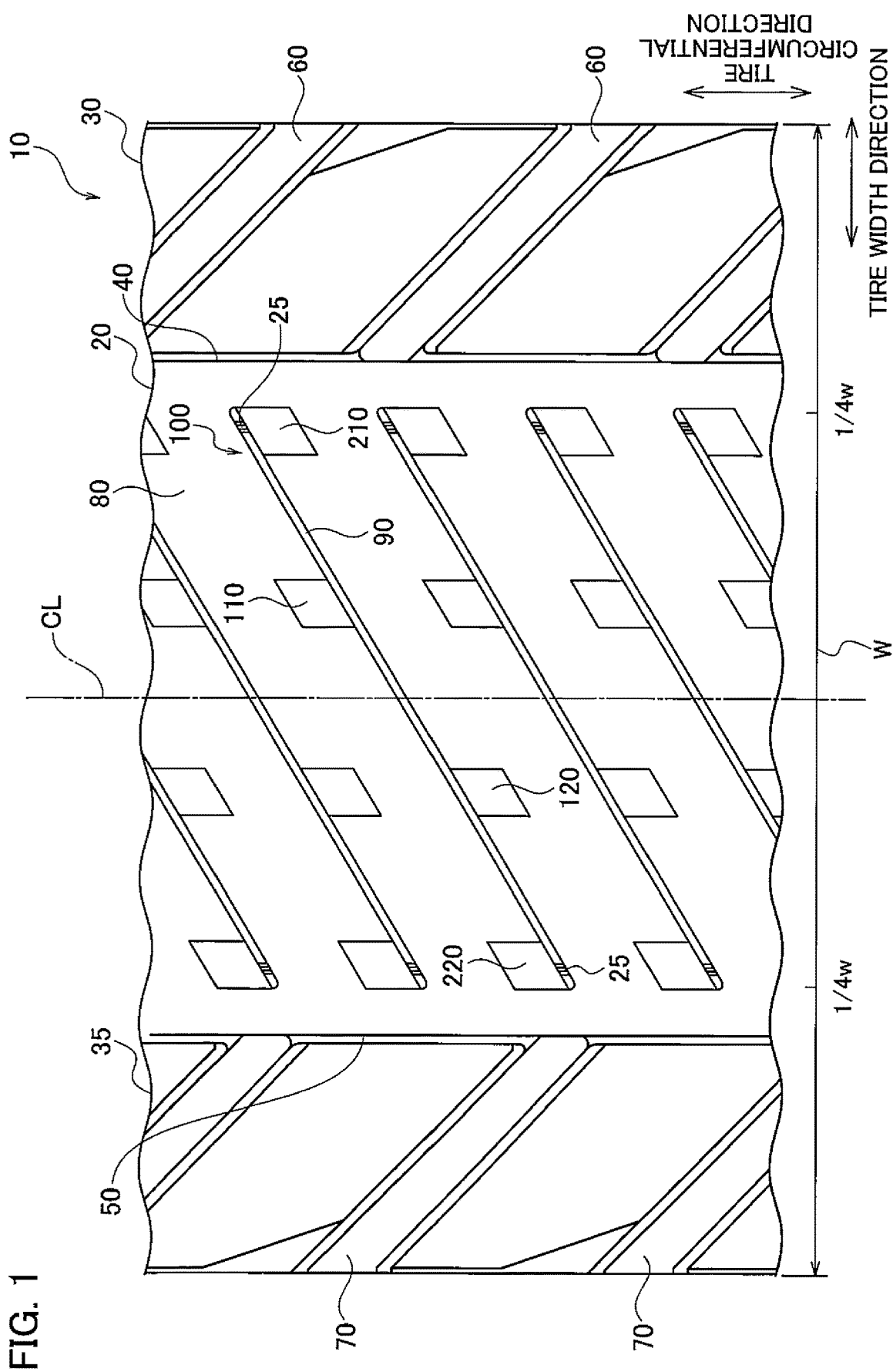
FIG. 1 is a plane developed view illustrating a part of a construction vehicle tire 10.

FIG. 1 is a plane developed view illustrating a part of a construction vehicle tire 10 according to the present embodiment. The construction vehicle tire 10 is formed as a pneumatic tire mounted to a dump truck or the like that travels on an uneven ground such as a mine.

A size of the construction vehicle tire 10 is not especially limited, however a tire of 49, 51, 57, or 63 inches is widely adopted. The construction vehicle tire 10 may be also called an ORR (Off-the-Road Radial) tire. However, the construction vehicle tire 10 is not always limited to the radial tire. Further, a rotation direction of the construction vehicle tire 10 is not especially designated.

As shown in FIG. 1, the construction vehicle tire 10 is provided with a tread 20 that contacts a road surface. A center block 80 is formed in the tread 20.

Specifically, the center block 80 is formed in a center part in a tire width direction. The center part in the tire width direction denotes a predetermined range including a tire equatorial line CL. More specifically, the center block 80 is formed in a range of ⅛-⅜, inclusive, of a tread width W in each of one side and another side in the tire width direction with respect to the tire equatorial line CL.

A circumferential direction groove extended in a tire circumferential direction is not formed in the center block 80. Further, a width direction groove (lug groove) extended in the tire width direction is not also formed in the center block 80. That is, in the present embodiment, a width direction narrow groove 90 and a notch groove 100 are only formed in the center block 80.

A circumferential direction groove 40 and a circumferential direction groove 50, which are extended in the tire circumferential direction, are formed in the construction vehicle tire 10. The circumferential direction groove 40 defines the center block 80 and a shoulder block 30 at one side with respect to the tire equatorial line CL.

A shoulder lug groove 60 is formed in the shoulder block 30. The shoulder lug groove 60 is formed at an outer side in the tire width direction of the center block 80. The shoulder lug groove 60 is extended along the tire width direction.

The circumferential direction groove 50 defines the center block 80 and a shoulder block 35 at another side with respect to the tire equatorial line CL.

A shoulder lug groove 70 is formed in the shoulder block 35. The shoulder lug groove 70 is formed at an outer side in the tire width direction of the center block 80. The shoulder lug groove 70 is extended along the tire width direction.

The width direction narrow groove 90 is extended in the tire width direction. Practically, the width direction narrow groove 90 is not parallel to the tire width direction but inclined against the tire width direction. Specifically, the width direction narrow groove 90 is inclined against the tire width direction at approximately 30 degrees. The angle is preferably set in a range between 15 degrees and 45 degrees. Further, in the present embodiment, a width of the width direction narrow groove 90 along the tire circumferential direction is constant in the tire width direction.

The width direction narrow groove 90 is terminated in the center block 80. That is, the width direction narrow groove 90 is not communicated with the circumferential direction groove 40 and the circumferential direction groove 50.

In the present embodiment, the width of the width direction narrow groove 90 is approximately 10 mm, and a depth of the width direction narrow groove 90 is approximately 100 mm (in a tire of 63 inches). The width and the depth of the groove may be changed as needed in accordance with a size or a specification of the tire. In tires of 49 inches to 63 inches adopted as the construction vehicle tire, the width of the groove is approximately 3 mm to 10 mm, and the depth of the groove is approximately 40 mm to 100 mm.

The notch groove 100 is communicated with the width direction narrow groove 90. The notch groove 100 includes an inner groove 110, an inner groove 120, an outer groove 210 and an outer groove 220. That is, the notch groove 100 is formed by four grooves.

The outer groove 210 is formed at one end side in the tire width direction of the width direction narrow groove 90. In the present embodiment, the outer groove 210 is served as a first outer groove.

The outer groove 220 is formed at another end side in the tire width direction of the width direction narrow groove 90. In the present embodiment, the outer groove 220 is served as a second outer groove.

The inner groove 110 and the inner groove 120 are formed between the outer groove 210 and the outer groove 220. That is, a plurality of the inner grooves is formed between the outer groove 210 and the outer groove 220.

The inner groove 110 is adjacent to the outer groove 210 at one side in the tire width direction with respect to the tire equatorial line CL. In the present embodiment, the inner groove 110 is served as a first inner groove.

The inner groove 120 is adjacent to the outer groove 220 at another side in the tire width direction with respect to the tire equatorial line CL. In the present embodiment, the inner groove 120 is served as a second inner groove.

That is, in each group of the outer groove 210 and the inner groove 110, the inner groove 110 and the inner groove 120, and the inner groove 120 and the outer groove 220, the extending directions thereof are opposite to each other in the tire circumferential direction.

Each width of the inner groove 110, the inner groove 120, the outer groove 210 and the outer groove 220 is approximately 50 mm.

In the present embodiment, each groove, which forms the notch groove 100, is separated from the groove adjacent thereto by a distance of approximately ⅛ of the tread width W.

Specifically, it is preferable that the outer groove 210 and the inner groove 110 adjacent to the outer groove 210 are separated to each other by a distance of ⅛ or more of the tread width W. Similarly, it is preferable that the outer groove 220 and the inner groove 120 adjacent to the outer groove 220 are separated to each other by a distance of ⅛ or more of the tread width W. Further, it is preferable that the inner groove 110 and the inner groove 120 adjacent to each other are similarly separated to each other by a distance of ⅛ or more of the tread width W. Here, the wording of "adjacent" includes an arrangement in which the grooves adjoin with a certain gap.

Further, in the present embodiment, the notch groove 100 is formed in point-symmetry with respect to the center in the tire width direction of the width direction narrow groove 90. The center in the tire width direction of the width direction narrow groove 90 denotes a center part in the tire width direction of the width direction narrow groove 90, which is an intersection between the width direction narrow groove 90 and the tire equatorial line CL in the present embodiment.

That is, the notch groove 100 is formed in point-symmetry with respect to the tire equatorial line CL. However, the tire equatorial line CL is not always used as the reference. For example, in a case in which the center part in the tire width direction of the width direction narrow groove 90 or the notch groove 100 is slightly offset from the tire equatorial line CL, it is preferable that the notch groove 100 is formed in point-symmetry with respect to the center part in the tire width direction of the width direction narrow groove 90 (or the notch groove 100).

In the present embodiment, each of the outer groove 210 and the outer groove 220 (the center in the tire width direction of each of the outer groove 210 and the outer groove 220) is formed in a predetermined range defined by a position, which is separated from the tire equatorial line CL by a distance of ¼ of the tread width W, as a reference. The predetermined range denotes a range of approximately one groove forming the notch grooves 110 (namely, approximately ±50 mm).

Further, a tread wear indicator 25 that indicates a wear state of the tread 20 is formed at a position separated from the tire equatorial line CL by a distance of ¼ of the tread width W. The tread wear indicator 25 is protruded toward an outer side in a tire radial direction from a bottom of the width direction narrow groove 90.

A plurality of the width direction narrow grooves 90 and a plurality of the notch grooves 100 are formed along the tire circumferential direction. The notch grooves 100 adjacent to each other in the tire circumferential direction are partially overlapped with each other in the tire width direction.

Specifically, a part of the inner groove 110 (first inner groove) is overlapped in the tire width direction with a part of the inner groove 120 (second inner groove) of the notch groove 100 adjacent in the tire circumferential direction.

More specifically, a part of the inner groove 110 and a part of the inner groove 120 of the notch groove 100 adjacent in the tire circumferential direction are overlapped in the tire width direction so as to be located on a straight line passing one end in the tire circumferential direction of the inner groove 110 to be parallel to the tire width direction. The one end in the tire circumferential direction of the inner groove 110 denotes an end of the inner groove 110 at a side opposite to a side of the width direction narrow groove 90 with which the inner groove 110 is communicated. Further, the end may be defined by any apex at the outer side or the inner side in the tire width direction of the inner groove 110 (slope portion 130) formed in a parallelogram.

(2) Shape of Notch Groove

Figure 2:
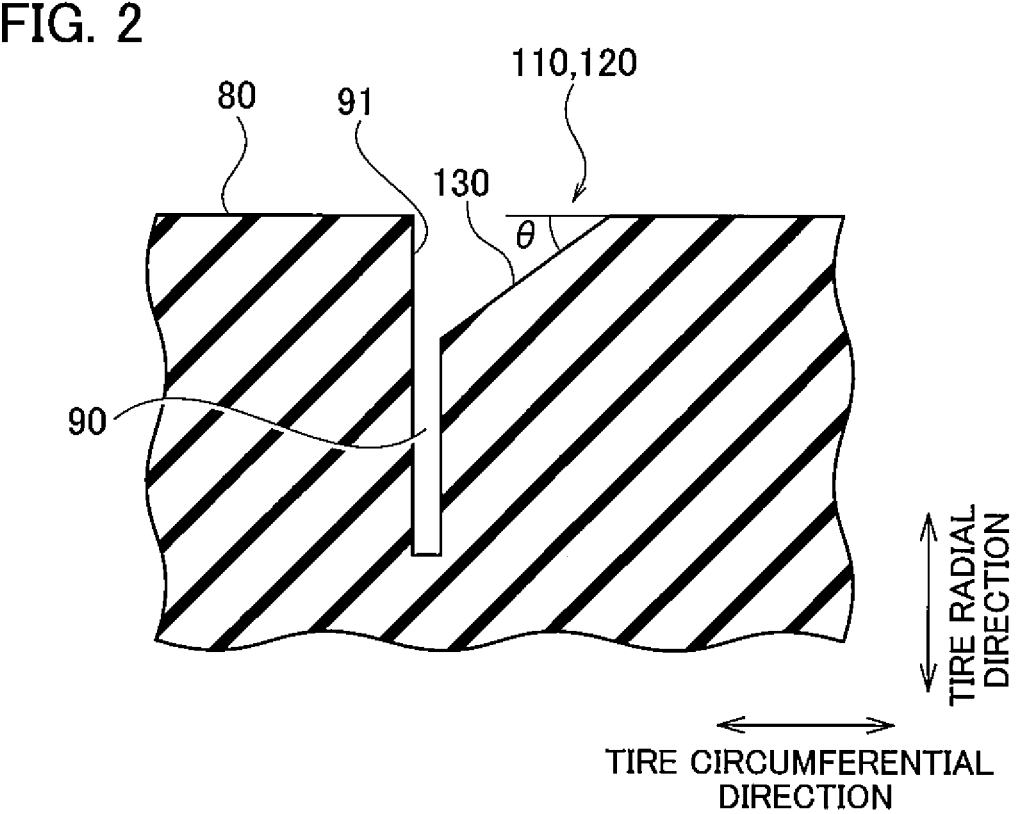
FIG. 2 is a cross-sectional view along a tire circumferential direction illustrating an inner groove 110 and an inner groove 120 (including a width direction narrow groove 90).
Figure 3:
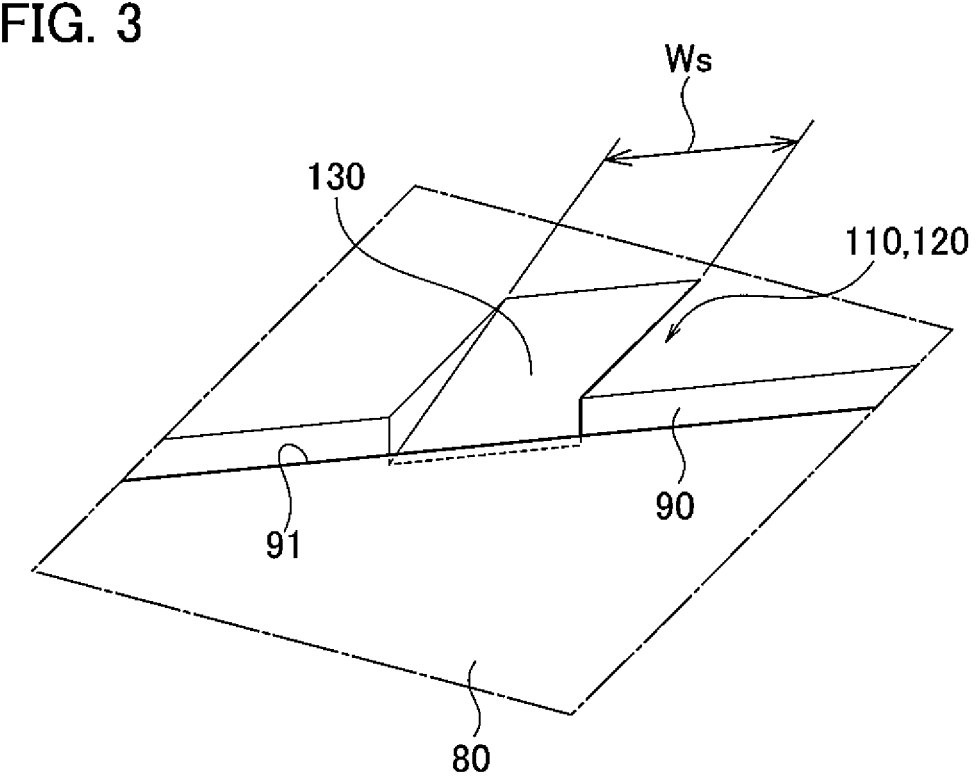
FIG. 3 is a perspective view illustrating the inner groove 110 and the inner groove 120.

Next, a shape of the notch groove 100 will be described. FIG. 2 is a cross-sectional view along the tire circumferential direction illustrating the inner groove 110 and the inner groove 120 (including the width direction narrow groove 90). FIG. 3 is a perspective view illustrating the inner groove 110 and the inner groove 120.

In FIG. 2 and FIG. 3, both of the inner groove 110 and the inner groove 120 are commonly illustrated, however the illustrated directions of the inner groove 110 and the inner groove 120 are opposite to each other.

Specifically, FIG. 2 illustrates a shape of the inner groove 110 in a view from a side of the shoulder block 30 shown in FIG. 1, and illustrates a shape of the inner groove 120 in a view from a side of the shoulder block 35 shown in FIG. 1. FIG. 3 illustrates the shape of each of the inner groove 110 and the inner groove 120 in a view from a side of the width direction narrow groove 90.

As described above, the notch groove 100 is formed in point-symmetry with respect to the center in the tire width direction of the width direction narrow groove 90. That is, the inner groove 110 and the inner groove 120 have a mutually similar shape although inclined directions of the slope portions 130 are opposite to each other as described below.

As shown in FIG. 2 and FIG. 3, each of the inner groove 110 and the inner groove 120 has the slope portion 130 inclined toward an inner side in the tire radial direction.

Specifically, the slope portion 130 of the inner groove 110 is inclined to be close to the inner side in the tire radial direction toward another side in the tire circumferential direction. That is, the inner groove 110 is inclined in the opposite direction to the outer groove 210 and inclined in the same direction as the outer groove 220, in the tire circumferential direction.

While, the slope portion 130 of the inner groove 120 is inclined to be close to the inner side in the tire radial direction toward one side in the tire circumferential direction. That is, the inner groove 120 is inclined in the same direction as the outer groove 210 and inclined in the opposite direction to the outer groove 220, in the tire circumferential direction.

The slope portion 130 is formed in a parallelogram so as to include a side inclined parallel to the inclined direction of the width direction narrow groove 90 in a tread surface view.

As described above, a width Ws of the slope portion 130, namely the width of each of the inner groove 110 and the inner groove 120 is approximately 50 mm. An inclined angle θ of the slope portion 130 against a surface of the center block 80 (alternatively, the tread 20) is approximately 20 degrees.

Since each of the inner groove 110 and the inner groove 120 has the slope portion 130, air flows into the width direction narrow groove 90 through the slope portion 130 when the construction vehicle tire 10 is rolling. Specifically, the air collides with a groove wall 91 of the width direction narrow groove 90 through the slope portion 130 and spreads in the width direction narrow groove 90. An air flow passage to the width direction narrow groove 90 and the notch groove 100 is further described below.

Figure 4:
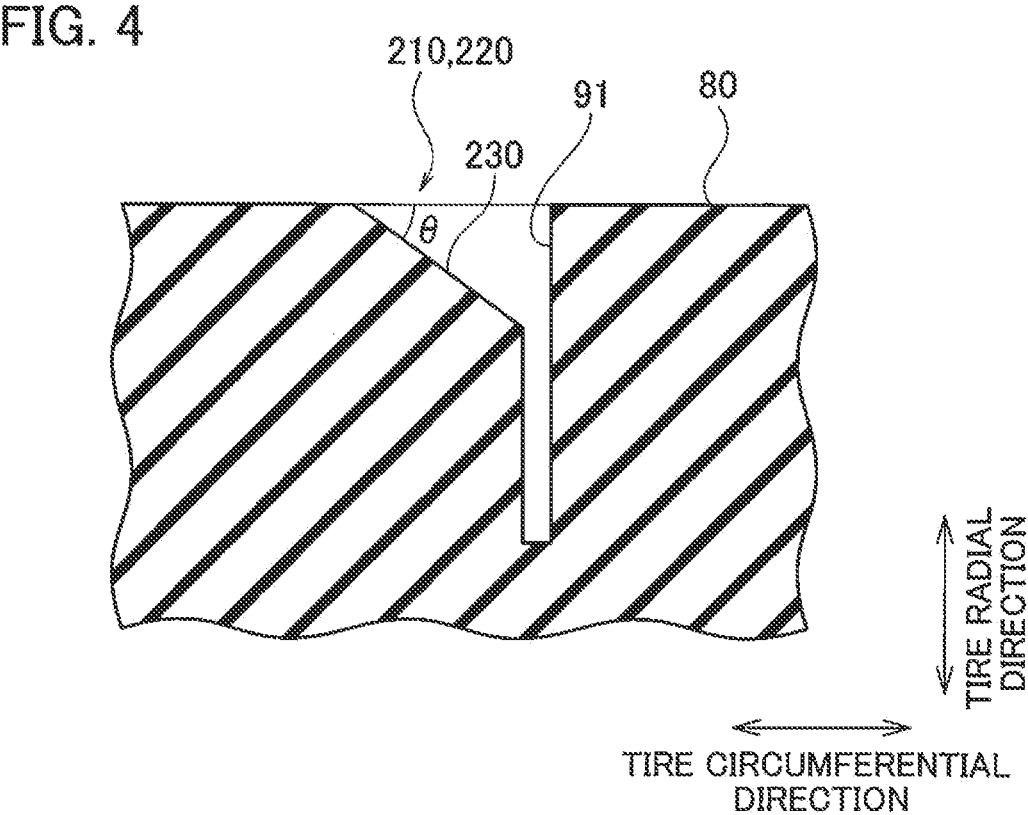
FIG. 4 is a cross-sectional view along the tire circumferential direction illustrating an outer groove 210 and an outer groove 220 (including the width direction narrow groove 90).
Figure 5:
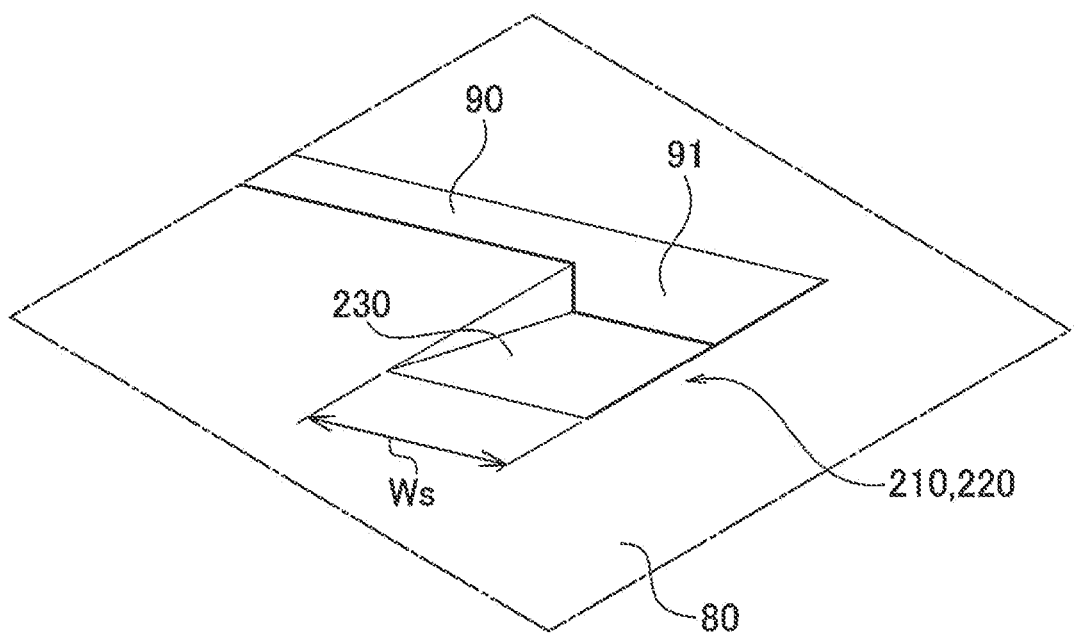
FIG. 5 is a perspective view illustrating the outer groove 210 and the outer groove 220.

FIG. 4 is a cross-sectional view along the tire circumferential direction illustrating the outer groove 210 and the outer groove 220 (including the width direction narrow groove 90). FIG. 5 is a perspective view illustrating the outer groove 210 and the outer groove 220.

In FIG. 4 and FIG. 5, both of the outer groove 210 and the outer groove 220 are commonly illustrated, however the illustrated directions of the outer groove 210 and the outer groove 220 are opposite to each other.

Specifically, FIG. 4 illustrates a shape of the outer groove 210 in a view from the side of the shoulder block 30 shown in FIG. 1, and illustrates a shape of the outer groove 220 in a view from the side of the shoulder block 35 shown in FIG. 1. FIG. 5 illustrates the shape of each of the outer groove 210 and the outer groove 220 in a view from a side of a slope portion 230.

As described above, the notch groove 100 is formed in point-symmetry with respect to the center in the tire width direction of the width direction narrow groove 90. That is, the outer groove 210 and the outer groove 220 also have a mutually similar shape although inclined directions of the slope portions 230 are opposite to each other as described below.

As shown in FIG. 4 and FIG. 5, each of the outer groove 210 and the outer groove 220 has the slope portion 230 inclined toward the inner side in the tire radial direction.

Specifically, the slope portion 230 of the outer groove 210 is inclined to be close to the inner side in the tire radial direction toward one side in the tire circumferential direction. That is, the outer groove 210 is inclined in the opposite direction to the inner groove 110 and inclined in the same direction as the inner groove 120, in the tire circumferential direction.

While, the slope portion 230 of the outer groove 220 is inclined to be close to the inner side in the tire radial direction toward another side in the tire circumferential direction. That is, the outer groove 220 is inclined in the same direction as the inner groove 110 and inclined in the opposite direction to the inner groove 120, in the tire circumferential direction.

A width Ws of the slope portion 230, namely the width of each of the outer groove 210 and the outer groove 220 is approximately 50 mm. An inclined angle θ of the slope portion 230 against the surface of the center block 80 (alternatively, the tread 20) is approximately 20 degrees.

(3) Air Flow Passage to Width Direction Narrow Groove and Notch Groove

Figure 6:
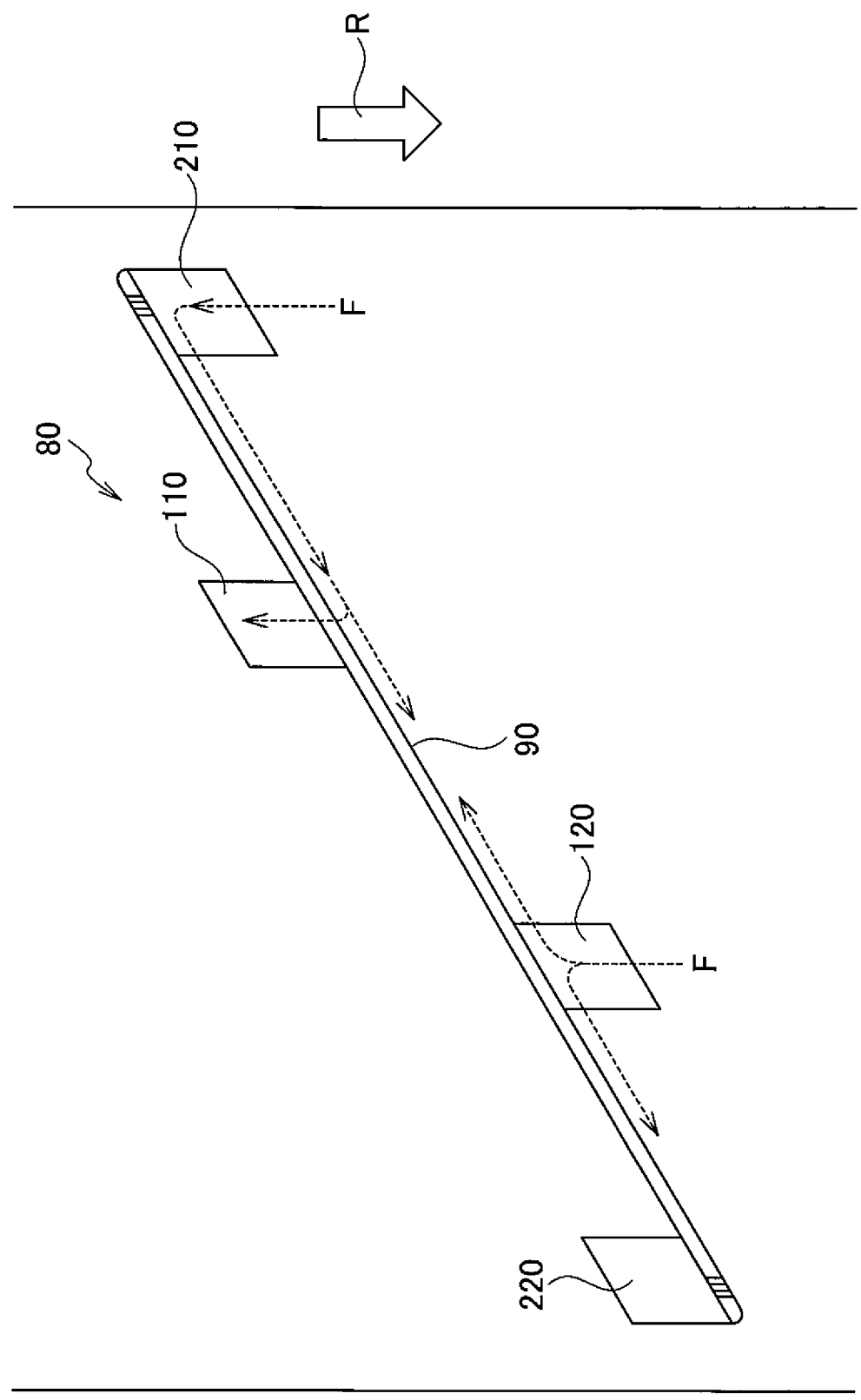
FIG. 6 is a view illustrating an air flow passage to the width direction narrow groove 90 and a notch groove 100.

Next, the air flow passage to the width direction narrow groove 90 and the notch groove 100 described above will be described. FIG. 6 a view illustrating the air flow passage to the width direction narrow groove 90 and the notch groove 100.

As shown in FIG. 6, when the vehicle to which the construction vehicle tire 10 is mounted travels, the construction vehicle tire 10 rotates (rolls) along a rotation direction R. When the construction vehicle tire 10 rotates along the rotation direction R, an air flow F flows into the width direction narrow groove 90 through the inner groove 120 and the outer groove 210 (see arrows illustrated by a dotted line in the figure).

Specifically, the air flow F flows into the width direction narrow groove 90 through the slope portion 130 (not shown in FIG. 6, see FIG. 2 and FIG. 3) of the inner groove 120 and the slope portion 230 (not shown in FIG. 6, see FIG. 4 and FIG. 5) of the outer groove 210.

The air flow F that flows into the width direction narrow groove 90 collides with the groove wall 91 (not shown in FIG. 6, see FIG. 2 to FIG. 5) of the width direction narrow groove 90 and flows along the tire width direction. A part of the air flow F that flows into the width direction narrow groove 90 flows out to the surface of the center block 80 through the slope portion 130 (see FIG. 2 and FIG. 3) of the inner groove 110.

Although it is not illustrated, a part of the air flow F that flows into the width direction narrow groove 90 may flow out to the surface of the center block 80 through the slope portion 230 (see FIG. 4 and FIG. 5) of the outer groove 220.

(4) Modified Examples

Figure 7:
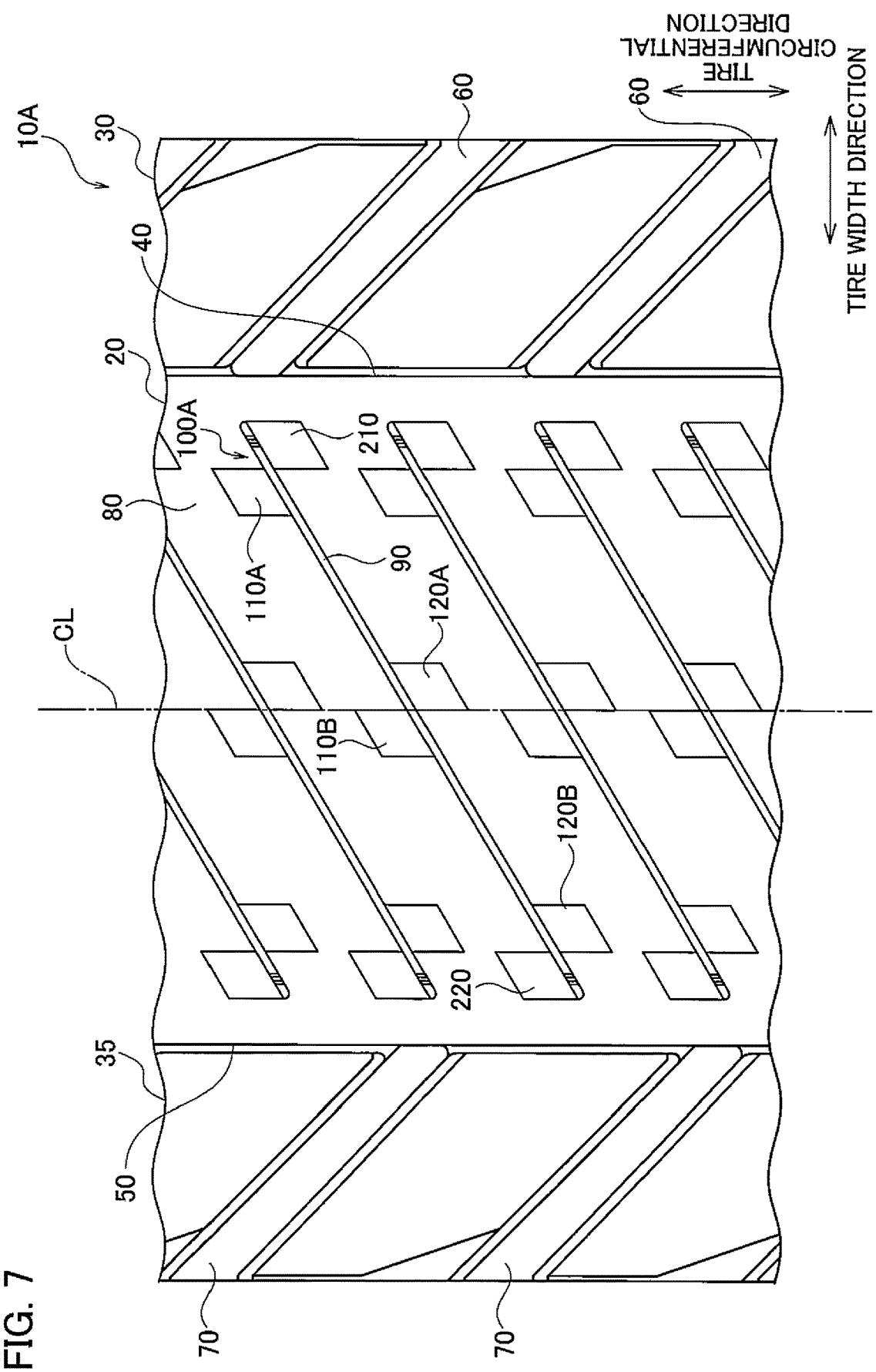
FIG. 7 is a plane developed view illustrating a part of a construction vehicle tire 10A according to a first modified example.
Figure 8:
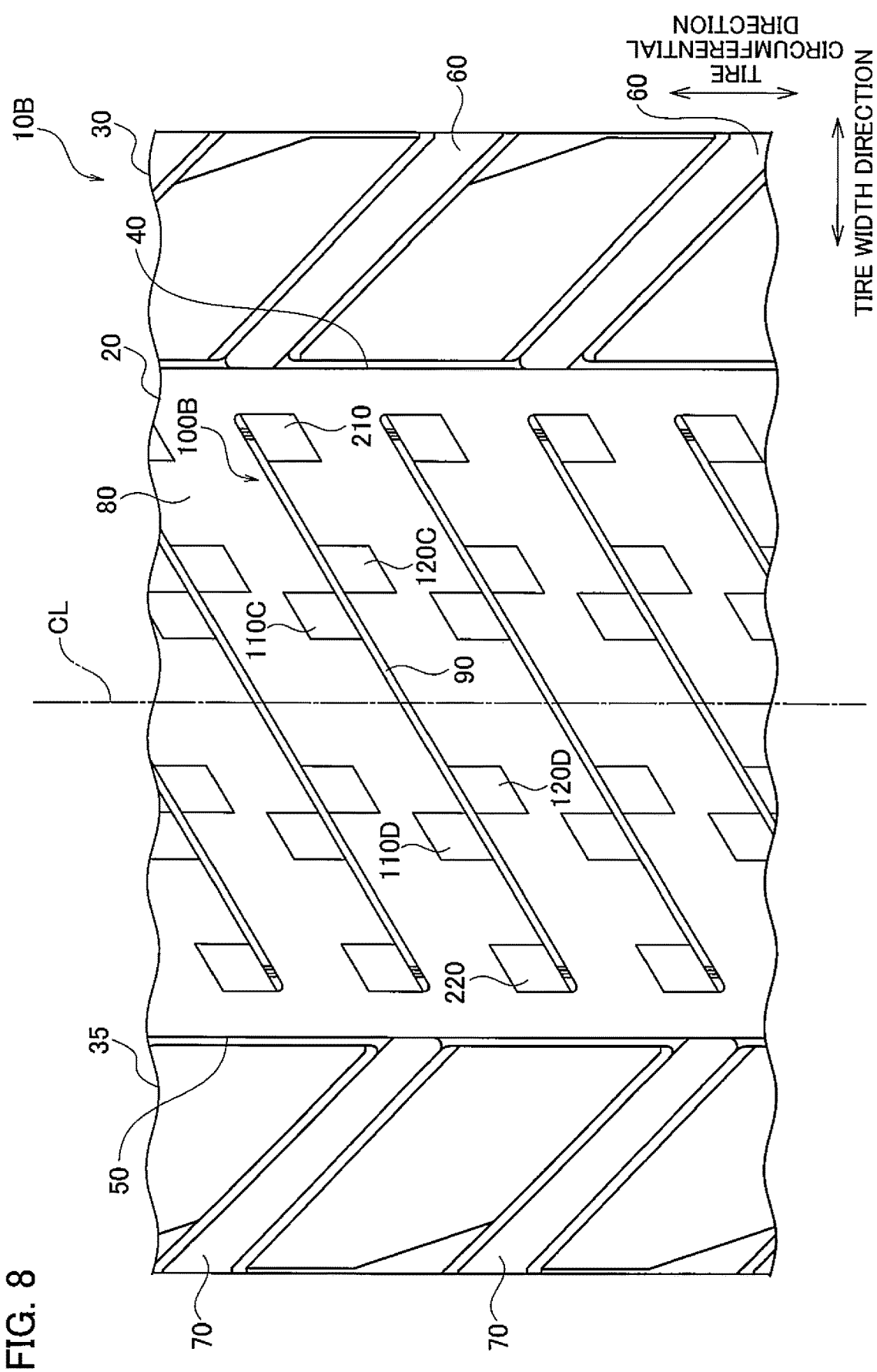
FIG. 8 is a plane developed view illustrating a part of a construction vehicle tire 10B according to a second modified example.

Next, modified examples of the construction vehicle tire 10 will be described. FIG. 7 is a plane developed view illustrating a part of a construction vehicle tire 10A according to a first modified example. FIG. 8 is a plane developed view illustrating a part of a construction vehicle tire 10B according to a second modified example. Hereinafter, a configuration different from that of the construction vehicle tire 10 is mainly described, and therefore a description of a similar configuration is omitted as needed.

(4.1) First Modified Example

As shown in FIG. 7, a plurality of notch grooves 100A is formed in the center block 80 of the construction vehicle tire 10A.

An inner groove 110A is adjacent to the outer groove 210 without a gap. Similarly, an inner groove 120B is adjacent to the outer groove 220 without a gap.

An inner groove 110B and an inner groove 120A are adjacent to each other without a gap. In the present modified example, the tire equatorial line CL is located on a boundary between the inner groove 110B and the inner groove 120A.

Each of the inner groove 110A and the inner groove 110B has the same shape as the inner groove 110 of the notch groove 100. Further, each of the inner groove 120A and the inner groove 120B has the same shape as the inner groove 120 of the notch groove 100.

In this way, in the notch groove 100A, a slope portion (not shown in FIG. 7) of each of the inner grooves (inner grooves 110A, 110B, 120A and 120B) is inclined to be close to the inner side in the tire radial direction toward one side or another side in the tire circumferential direction.

Further, the inner groove 120A, the inner groove 120B and the outer groove 210, which are inclined in the same direction, are separated to each other by a distance of ⅛ or more of the tread width W. Similarly, the inner groove 110A, the inner groove 110B and the outer groove 220 are separated to each other by a distance of ⅛ or more of the tread width W. Further, in the first modified example shown in FIG. 7, the inner groove 120A, the inner groove 120B and the outer groove 210 are arranged at the same interval. Similarly, the inner groove 110A, the inner groove 110B and the outer groove 220 are arranged at the same interval.

(4.2) Second Modified Example

As shown in FIG. 8, a plurality of notch grooves 100B is formed in the center block 80 of the construction vehicle tire 10B.

An inner groove 110C and an inner groove 120C are formed at a side of the shoulder block 30 with respect to the tire equatorial line CL. While, an inner groove 110D and an inner groove 120D are formed at a side of the shoulder block 35 with respect to the tire equatorial line CL.

The inner groove 110C and the inner groove 120C are adjacent to each other without a gap. Similarly, the inner groove 110D and the inner groove 120D are adjacent to each other without a gap.

Each of the inner groove 110C and the inner groove 110D has the same shape as the inner groove 110 of the notch groove 100. Further, each of the inner groove 120C and the inner groove 120D has the same shape as the inner groove 120 of the notch groove 100.

In this way, also in the notch groove 100B, a slope portion (not shown in FIG. 8) of each of the inner grooves (inner grooves 110C, 110D, 120C and 120D) is inclined to be close to the inner side in the tire radial direction toward one side or another side in the tire circumferential direction.

Further, the outer groove 210 and the inner groove 120C, and the inner groove 120C and the inner groove 120D are separated to each other by a distance of ⅛ or more of the tread width W, respectively. Similarly, the outer groove 220 and the inner groove 110D, and the inner groove 110D and the inner groove 110C are separated to each other by a distance of ⅛ or more of the tread width W, respectively.

(5) Functions and Effects

Table 1 and Table 2 show evaluation test results relating to the construction vehicle tire 10. Specifically, Table 1 and Table 2 show the evaluation test results relating to a temperature drop effect of the tread due to the slope-like notch groove formed in the center block.

TABLE 1

|  | Temperature drop effect (° C.) |
| --- | --- |
| Example | −2.6 |
| First modified example | −3.7 |
| Second modified example | −2.6 |

TABLE 2

|  | Temperature drop effect (° C.) |
| --- | --- |
| Example | −2.7 |
| First modified example | −2.3 |
| Second modified example | −3.0 |

In Table 1 and Table 2, methods for generating the air flow generated on the tread surface of the construction vehicle tire are different. A specification of the tire and a test method which are commonly adopted in Table 1 and Table 2 are described below.

Tire specification: 63 inches tire (tread width: approximately 1,200 mm)

Test machine: drum test machine

Load: predetermined load (100%)

Test method: after rolling the tire to be evaluated by using the drum test machine for a predetermined time, a temperature of the tread surface was measured at plural positions (at ⅜W, ¼W and ⅛W, and on tire equatorial line CL), and an average temperature thereof was calculated.

Table 1 shows the result of a case that uses only the air flow generated by rotating the construction vehicle tire by the drum test machine and rotates the construction vehicle tire at a rotation speed corresponding to a constant travelling speed.

While, Table 2 shows the result of a case that applies the air flow with a constant speed to the tread surface of the construction vehicle tire in addition to the air flow generated by rotating the construction vehicle tire by the drum test machine and rotates the construction vehicle tire at a rotation speed corresponding to a constant travelling speed.

The example shown in each of Table 1 and Table 2 corresponds to the construction tire 10 (see FIG. 1). Further, the first modified example and the second modified example correspond to the construction vehicle tire 10A (see FIG. 7) and the construction vehicle tire 10B (see FIG. 8), respectively.

Further, each of Table 1 and Table 2 shows a temperature drop amount of the center block (compared to the conventional example). Here, the conventional example corresponds to a construction vehicle tire in which a slope-like notch groove is not formed but a narrow groove extended in the tire width direction is formed in the center block. Furthermore, the width of the center block of the conventional example is small than that of each of the example and the modified examples.

As shown in Table 1 and Table 2, the example and the first and second modified examples are inferior in suppressing the temperature increase because the width of the center block is wide and the circumferential direction groove is not formed. However, the example and the first and second modified examples show the temperature drop effect equivalent to that of the conventional example in which the slope-like notch groove is not formed in a narrow center block.

Further, as shown in Table 2, also in a state in which the air flow, which approximates to the air flow in the actual travelling, is generated, the example and the first and second modified examples sufficiently show the temperature drop effect compared to the conventional example.

That is, according to the construction vehicle tire 10, the slope portion 230 of the outer groove 210 is inclined to be close to the inner side in the tire radial direction toward one side in the tire circumferential direction and the slope portion 230 of the outer groove 220 is inclined to be close to the inner side in the tire radial direction toward another side in the tire circumferential direction. Further, the slope portions 130 of the inner groove 110 and the inner groove 120 are inclined to be close to the inner side in the tire radial direction toward one side and another side in the tire circumferential direction, respectively. According to the notch groove 100 having such a structure, as shown in FIG. 6, the center block 80 can be cooled effectively by the air flow F.

Thus, even in a case in which the wide center block not including the circumferential direction groove is formed in order to ensure the wear resistance, the temperature increase of the tread 20 can be effectively suppressed. That is, according to the construction vehicle tire 10, both of ensuring the wear resistance of the tread 20 and suppressing the temperature increase of the tread 20 can be achieved at a high level.

In the present embodiment, each groove forming the notch groove 100 is separated from the adjacent groove by a distance of approximately ⅛ of the tread width W. Accordingly, the center block 80 is cooled by the air flow F flowing into the width direction narrow groove 90 and the air flow F is made to flow out from the width direction narrow groove 90 smoothly. With this, the temperature increase of the tread 20 can be further suppressed.

In the present embodiment, the notch groove 100 is formed in point-symmetry with respect to the center in the tire width direction of the width direction narrow groove 90. Accordingly, a similar effect that suppresses the temperature increase can be obtained in both rotation directions of the construction vehicle tire 10.

In the present embodiment, the slope portion 130 of the inner groove 110 is inclined to be close to the inner side in the tire radial direction toward another side in the tire circumferential direction and the slope portion 130 of the inner groove 120 is inclined to be close to the inner side in the tire radial direction toward one side in the tire circumferential direction. Accordingly, a similar effect that suppresses the temperature increase can be obtained in both rotation directions of the construction vehicle tire 10. Further, the inner groove 110 is inclined opposite to the outer groove 210, and the inner groove 120 is inclined opposite to the outer groove 220. Consequently, the air flow F flowing into the width direction narrow groove 90 is not prevented from flowing smoothly. With this, the temperature increase of the tread 20 can be further suppressed.

In the present embodiment, each of the outer groove 210 and the outer groove 220 is formed in the predetermined range defined by the position, which is separated from the tire equatorial line CL by a distance of ¼ of the tread width W, as a reference. Accordingly, even in a case in which the center block 80 is formed in a range of ⅛-⅜, inclusive, of a tire width direction W, the temperature increase of the center block 80 can be suppressed effectively.

In the present embodiment, a part of the inner groove 110 is overlapped in the tire width direction with a part of the inner groove 120 of the notch groove 100 adjacent in the tire circumferential direction. Specifically, a part of the inner groove 110 and a part of the inner groove 120 of the notch groove 100 adjacent in the tire circumferential direction are overlapped in the tire width direction so as to be located on a straight line passing one end in the tire circumferential direction of the inner groove 110 to be parallel to the tire width direction.

Accordingly, both of the suppression effect in the temperature increase caused by a plurality of the notch grooves 100 formed along the tire circumferential direction and ensuring the wear resistance of the center block 80 can be achieved at a high level. That is, in a case in which a gap between the notch grooves 100 adjacent to each other in the tire circumferential direction is too small, the rigidity of the center block 80 is deteriorated and the wear resistance is affected. On the other hand, in a case in which the gap between the notch grooves 100 is too large, the suppression effect in the temperature increase is not obtained sufficiently.

(6) Other Embodiments

As described above, the contents of the present invention are described with reference to the embodiment, however the present invention is not limited to those descriptions. It is obvious for a person skilled in the art to adopt various modifications and improvement.

For example, in the embodiment described above, a circumferential direction groove and a width direction groove (excluding the width direction narrow groove 90) are not formed at all in the center block 80, however a sipe-like narrow groove having a short length in a tread surface view may be formed in the center block 80.

In the embodiment (including the modified example) described above, two kinds of the inner grooves (for example, inner groove 110 and inner groove 120) having the slope portions respectively inclined to be close to the inner side in the tire radial direction toward one side and another side in the tire circumferential direction are formed, however the inner grooves may be inclined to be close to the inner side in the tire radial direction toward either one of the one side and the another side in the tire circumferential direction.

In the embodiment described above, the slope portion 130 and the slope portion 230 are formed in a parallelogram in the tread surface view, however the slope portion may not be formed in a parallelogram. For example, a part corresponding to a side of the slope portion may not be parallel to the groove wall 91 of the width direction narrow groove 90.

In the embodiment described above, the width direction narrow groove 90 is slightly inclined against the tire width direction from a viewpoint of suppressing uneven wear, however the width direction narrow groove 90 may be parallel to the tire width direction so as not to be inclined against the tire width direction.

As described above, the embodiments of the present invention are described, however the present invention is not limited to the description and the drawings forming a part of the present disclosure. Various modifications, examples, and operation techniques will be apparent from the present disclosure to a person skilled in the art.

INDUSTRIAL APPLICABILITY

The construction vehicle tire described above is useful because both of ensuring the wear resistance of the tread and suppressing the temperature increase of the tread are achieved at a high level, even in a case in which the wide center block not including a circumferential direction groove is provided.

REFERENCE SIGNS LIST 10, 10A, 10B: construction vehicle tire
20: tread
25: tread wear indicator
30, 35: shoulder block
40, 50: circumferential direction groove
60, 70: shoulder lug groove
80: center block
90: width direction narrow groove
91: groove wall
100, 100A, 100B: notch groove
110, 110A to 110D, 120, 120A to 120D: inner groove
130: slope portion
210, 220: outer groove
230: slope portion

The invention claimed is:

1. A construction vehicle tire comprising a tread having a center block formed in a center part in a tire width direction, the center block including a width direction narrow groove extended in the tire width direction, and a notch groove group communicated with the width direction narrow groove and having a slope portion inclined toward an inner side in a tire radial direction,
wherein:
the center block is formed in a range of $\frac{1}{8}$-$\frac{3}{8}$, inclusive, of a tread width in each of one side and another side in the tire width direction with respect to a tire equatorial line;
a circumferential direction groove extended in a tire circumferential direction is not formed in the center block;
the width direction narrow groove is terminated in the center block;
the notch groove group comprises a first outer groove formed at one end side in the tire width direction of the width direction narrow groove, a second outer groove formed at another end side in the tire width direction of the width direction narrow groove, and a plurality of inner grooves formed between the first outer groove and the second outer groove;
a slope portion of the first outer groove is inclined to be close to the inner side in the tire radial direction toward one side in the tire circumferential direction;
a slope portion of the second outer groove is inclined to be close to the inner side in the tire radial direction toward another side in the tire circumferential direction;
each of slope portions of the inner grooves is inclined to be close to the inner side in the tire radial direction toward one side or another side in the tire circumferential direction; and
each of the first outer groove and the inner groove adjacent to the first outer groove, the second outer groove and the inner groove adjacent to the second outer groove, and the inner grooves adjacent to each other are separated to each other by a distance of $\frac{1}{8}$ or more of the tread width.

2. The construction vehicle tire according to claim 1, wherein the notch groove group is formed in point-symmetry with respect to a center in the tire width direction of the width direction narrow groove.

3. The construction vehicle tire according to claim 1, wherein:
a plurality of the inner grooves includes a first inner groove adjacent to the first outer groove at one side in the tire width direction with respect to the tire equatorial line, and a second inner groove adjacent to the second outer groove at another side in the tire width direction with respect to the tire equatorial line;

a slope portion of the first inner groove is inclined to be close to the inner side in the tire radial direction toward another side in the tire circumferential direction; and a slope portion of the second inner groove is inclined to be close to the inner side in the tire radial direction toward one side in the tire circumferential direction.

4. The construction vehicle tire according to claim 1, wherein each the first outer groove and the second outer groove is formed in a predetermined range defined by a position, which is separated from the tire equatorial line by a distance of ¼ of the tread width, as a reference.

5. The construction vehicle tire according to claim 3, wherein the notch groove group includes a plurality of notch groove groups formed along the tire circumferential direction, and wherein a part of the first inner groove and a part of the second inner groove of adjacent notch groove groups of the plurality of notch groove groups in the tire circumferential direction are overlapped in the tire width direction so as to be located on a straight line passing one end in the tire circumferential direction of the first inner groove to be parallel to the tire width direction.

6. The construction vehicle tire according to claim 2, wherein:

a plurality of the inner grooves includes a first inner groove adjacent to the first outer groove at one side in the tire width direction with respect to the tire equatorial line, and a second inner groove adjacent to the second outer groove at another side in the tire width direction with respect to the tire equatorial line;

a slope portion of the first inner groove is inclined to be close to the inner side in the tire radial direction toward another side in the tire circumferential direction; and a slope portion of the second inner groove is inclined to be close to the inner side in the tire radial direction toward one side in the tire circumferential direction.

7. The construction vehicle tire according to claim 2, wherein each the first outer groove and the second outer groove is formed in a predetermined range defined by a position, which is separated from the tire equatorial line by a distance of ¼ of the tread width, as a reference.

8. The construction vehicle tire according to claim 3, wherein each the first outer groove and the second outer groove is formed in a predetermined range defined by a position, which is separated from the tire equatorial line by a distance of ¼ of the tread width, as a reference.

9. The construction vehicle tire according to claim 6, wherein each the first outer groove and the second outer groove is formed in a predetermined range defined by a position, which is separated from the tire equatorial line by a distance of ¼ of the tread width, as a reference.

10. The construction vehicle tire according to claim 6, wherein the notch groove group includes a plurality of notch groove groups formed along the tire circumferential direction, and wherein a part of the first inner groove and a part of the second inner groove of adjacent notch groove groups of the plurality of notch groove groups in the tire circumferential direction are overlapped in the tire width direction so as to be located on a straight line passing one end in the tire circumferential direction of the first inner groove to be parallel to the tire width direction.

\* \* \* \* \*